United States Patent
Aioanei

(10) Patent No.: US 9,929,568 B2
(45) Date of Patent: Mar. 27, 2018

(54) METHODS AND APPARATUSES FOR POWER CONTROL DURING BACKSCATTER MODULATION IN WIRELESS POWER RECEIVERS

(71) Applicant: Integrated Device Technology, Inc., San Jose, CA (US)

(72) Inventor: Ovidiu C. Aioanei, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 763 days.

(21) Appl. No.: 14/498,730

(22) Filed: Sep. 26, 2014

(65) Prior Publication Data

US 2016/0094041 A1  Mar. 31, 2016

(51) Int. Cl.
*H02J 50/12* (2016.01)
*H02J 5/00* (2016.01)
*H02J 7/02* (2016.01)

(52) U.S. Cl.
CPC ............. *H02J 5/005* (2013.01); *H02J 7/025* (2013.01); *H02J 50/12* (2016.02)

(58) Field of Classification Search
CPC ............. H02J 5/005; H02J 50/12; H02J 7/025
See application file for complete search history.

(56) References Cited

U.S. PATENT DOCUMENTS

| 9,318,897 B2* | 4/2016 | Brohlin | H02J 5/005 |
|---|---|---|---|
| 2008/0303479 A1 | 12/2008 | Park et al. | |
| 2011/0163608 A1* | 7/2011 | Brohlin | H02J 5/005 |
| | | | 307/104 |
| 2012/0188041 A1 | 7/2012 | Kook | |
| 2013/0257360 A1 | 10/2013 | Singh | |
| 2013/0260676 A1 | 10/2013 | Singh | |
| 2014/0225560 A1* | 8/2014 | Walley | H01M 2/0267 |
| | | | 320/108 |
| 2016/0020643 A1* | 1/2016 | Abe | H02J 7/025 |
| | | | 320/108 |

OTHER PUBLICATIONS

International Search Report for PCT Application No. PCT/US2015/052466 issued by the Korean Intellectual Property Office dated Jan. 6, 2016; pp. 1-3.
Written Opinion for PCT Application No. PCT/US2015/052466 issued by the Korean Intellectual Property Office dated Jan. 6, 2016; pp. 1-4.

* cited by examiner

*Primary Examiner* — Jared Fureman
*Assistant Examiner* — Emmanuel R Dominique
(74) *Attorney, Agent, or Firm* — Haynes and Boone, LLP

(57) ABSTRACT

A wireless power enabled apparatus including a wireless power receiver. The wireless power receiver includes a receive coil configured to generate an AC power signal responsive to a wireless power signal. A rectifier is configured to receive the AC power signal and generate a DC rectified power signal. A power transistor in a pass-transistor configuration is configured to receive the DC rectified power signal and generate an output power signal. A compensation current source operably coupled to the output power signal is configured to maintain a substantially constant voltage on the output power signal by adjusting a current through the compensation current source during a communication period employing backscatter modulation on the receive coil.

20 Claims, 4 Drawing Sheets

— METHODS AND APPARATUSES FOR POWER CONTROL DURING BACKSCATTER MODULATION IN WIRELESS POWER RECEIVERS

FIELD

Embodiments of the present disclosure relate generally to wireless power transfer and, more particularly, to apparatuses and related methods for wireless power receivers.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space and one needs to find a suitable outlet for the adaptor. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

BRIEF SUMMARY

Embodiments of the present disclosure include a wireless power receiver, which includes a receive coil configured to generate an AC power signal responsive to a wireless power signal. The wireless power receiver also includes a rectifier configured to receive the AC power signal and generate a DC rectified power signal. A power transistor is operably coupled in a pass-transistor configuration between the DC rectified power signal and an output power signal. The power transistor is configured to operate in a substantially constant current mode during a communication period. A compensation current source is configured to maintain a substantially constant voltage on the output power signal by adjusting a current through the compensation current source. Control logic is configured to enable the compensation current source during the communication period employing backscatter modulation on the receive coil.

Embodiments of the present disclosure also include a method of operating a receiver side of a wireless power transfer system. The method includes generating an AC power signal responsive to a wireless power signal exciting a receive coil at a resonant frequency and rectifying the AC power signal to generate a DC rectified power signal. An output power signal is generated from the DC rectified power signal at a substantially constant current during a communication period. A substantially constant voltage is maintained on the output power signal by adjusting a current through a compensation current source during the communication period employing backscatter modulation on the receive coil.

Still other embodiments of the present disclosure include a wireless power enabled apparatus including a wireless power receiver. The wireless power receiver includes a receive coil configured to generate an AC power signal responsive to a wireless power signal. A rectifier is configured to receive the AC power signal and generate a DC rectified power signal. A power transistor is operably coupled between the DC rectified power signal and an output power signal in a pass-transistor configuration. The power transistor is configured to operate in a substantially constant current mode during a communication period. A compensation current source operably coupled to the output power signal is configured to maintain a substantially constant voltage on the output power signal by adjusting a current through the compensation current source during the communication period employing backscatter modulation on the receive coil.

DETAILED DESCRIPTION

Figure 1:
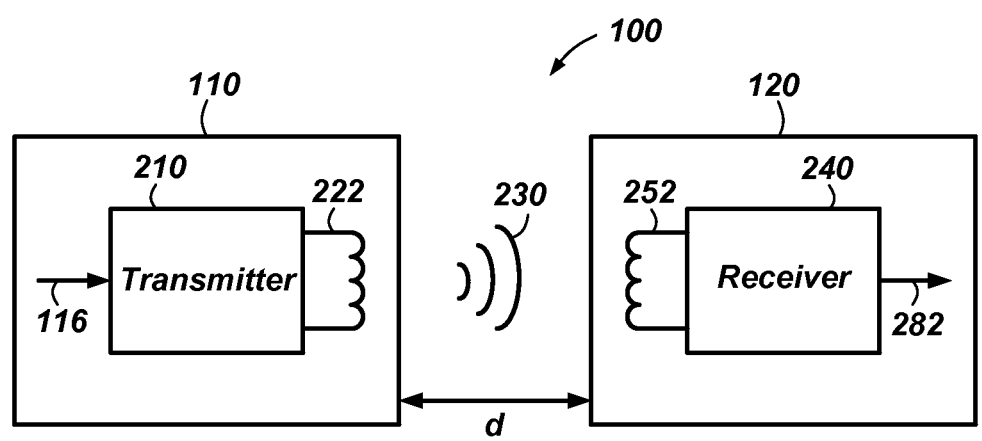
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

When describing circuit elements, such as, for example, resistors, capacitors, and transistors, designators for the circuit elements begin with an element type designator (e.g., R, C, M) followed by a numeric indicator. Circuit element numbers may be repeated on different drawings and are not to be considered the same element unless expressly indicated as such. In other words, a capacitor C1 on FIG. 1 is a different element from a capacitor C1 on FIG. 6. Power sources such as, for example VDD and VCC as well as ground voltages may be generically indicated. When appropriate, these power signals may be described in detail. In other cases, the power signals may not be described, as it would be apparent to a person of ordinary skill in the art which power signal should be used. As a non-limiting example, it may be appropriate to maintain separate analog and digital grounds and a person of ordinary skill in the art would understand which is the appropriate ground for a specific circuit.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

It should be recognized that the devices of a wireless power transfer system are described herein primarily with respect to functionality of wireless power transfer; however, it should be recognized that the wireless power transfer system may include additional components to perform other features not specifically described herein or shown in the various figures, such as, for example, communication. As other examples, wireless power enabled devices may include foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

FIG. 1 is a schematic block diagram of a wireless power transfer system 200. The wireless power transfer system 200 includes a wireless power transmitting apparatus 110, and a wireless power receiving apparatus 120. The wireless power transmitting apparatus 110 includes a wireless power transmitter 210 having a transmit coil 222 configured to generate a wireless power signal 230 (e.g., electric field, magnetic field, electromagnetic field, etc.) for providing power transfer to the wireless power receiving apparatus 120. The wireless power receiving apparatus 120 includes a wireless power receiver 240 having a receive coil 252 configured to electromagnetically couple with the wireless power signal 230. The transmit coil 222 and the receive coil 252 may be sized according to the particular devices and applications to be associated therewith.

An input signal 116 may be provided to the wireless power transmitter 210 for generating the wireless power signal 230 that provides a power transfer to the wireless power receiving apparatus 120. The wireless power receiver 240 may couple to the wireless power signal 230 and may generate an output voltage 282 in response thereto. The output voltage 282 may provide the power that is used by the wireless power receiving apparatus 120 for storing (e.g., charging a battery), consumption (e.g., providing system power), or a combination thereof.

The wireless power transmitter 210 and the wireless power receiver 240 are separated by a distance (d). In some embodiments, the wireless power transmitter 210 and the wireless power receiver 240 may be configured according to a mutual inductance relationship, such that when the resonant frequency of the wireless power receiver 240 and the resonant frequency of the wireless power transmitter 210 are substantially identical, transmission losses between the wireless power transmitter 210 and the wireless power receiver 240 are minimal. Likewise, the frequency of the wireless power signal 230 may be set by the wireless power transmitter 210 at or near the resonant frequencies of the coils (114, 124). As a result, an effective power transfer may occur by coupling a large portion of the energy in the near-field of the transmit coil 222 to the receive coil 252 rather than propagating most of the energy in an electromagnetic wave to the far-field. If the wireless power receiving apparatus 120 is in the near-field (within some distance (d)), inductive coupling may occur between the transmit coil 222 and the receive coil 252. The area around the transmit coil 222 and the receive coil 252 where this near-field inductive coupling may occur may be referred to as a "coupling region." Because of this mutual inductance relationship, the wireless power transfer may be referred to as inductive wireless power transfer.

The transmit coil 222 and the receive coil 252 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 252 within a plane of the transmit coil 222 where the coupling region of the transmit coil 222 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which the wireless power signal 230 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured with both the wireless power transmitting apparatus 110 and the wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter. Moreover, either of the wireless power transmitting apparatus 110 and the wireless power receiving apparatus 120 may be referred to herein as a wireless power enabled apparatus or a wireless power enabled device.

Figure 2:
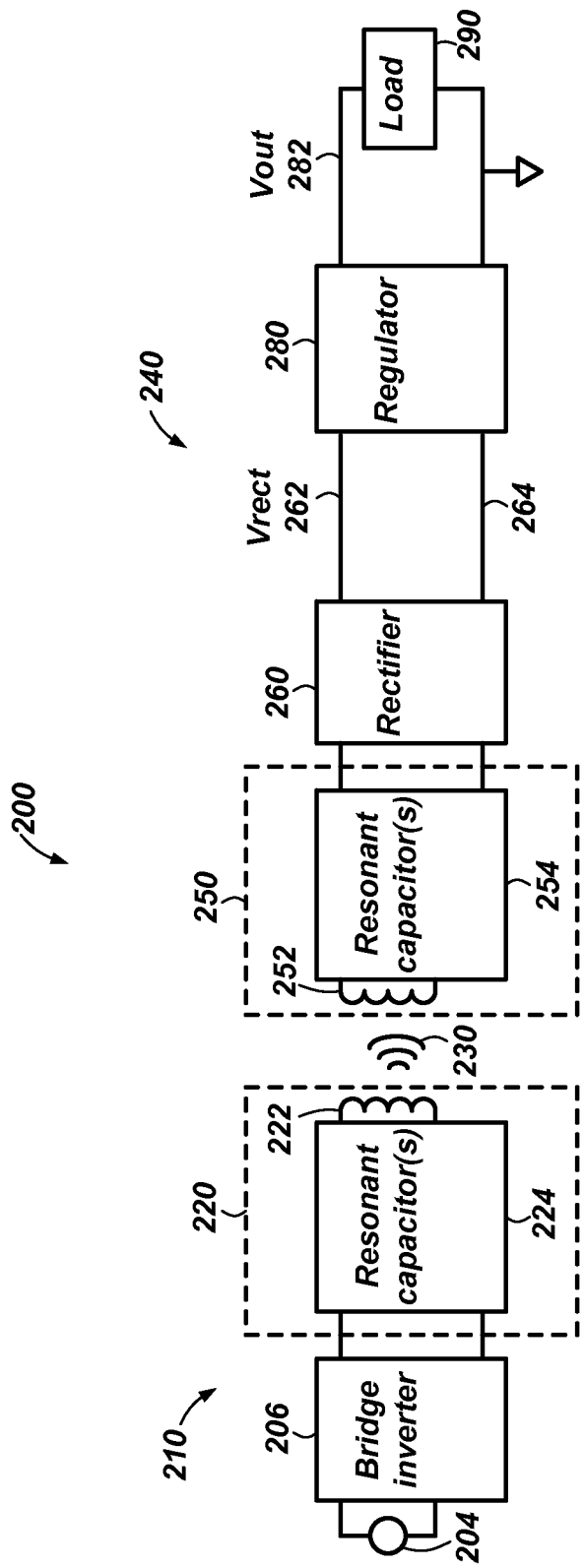
FIG. 2 is a more detailed schematic block diagram of a wireless power transfer system.

FIG. 2 is a more detailed schematic block diagram of a wireless power transfer system 200. The wireless power transfer system 200 includes a wireless power transmitter 210 and a wireless power receiver 240. The wireless power transmitter 210 and the wireless power receiver 240 may be configured to couple with each other according to a mutual inductance relationship such that wireless power signal 230 may be transferred from the wireless power transmitter 210 to the wireless power receiver 240.

The wireless power transmitter 210 may include a transmit resonant tank 220, a bridge inverter 206, and control logic (not shown) coupled together to generate the wireless power signal 230 transmitted to the wireless power receiver 240. The transmit resonant tank 220 may include a transmit coil 222 coupled with one or more transmit resonant capacitors 224. The bridge inverter 206 of the wireless power transmitter 210 may include a full bridge inverter, a half bridge inverter, or other appropriate circuit for receiving a DC input signal 204 and generating an AC signal through the transmit coil 222 for generating the wireless power signal 230.

The wireless power receiver 240 includes a receive resonant tank 250, a rectifier 260, and a regulator 280. The regulator 280 generates an output voltage ($V_{OUT}$) 268 in response to a rectified power signal (Vrect) 262 from the rectifier 260. The output voltage 268 may be provided to a load 290 (e.g., a battery, system components, etc.). The output voltage 268 may also be referred to herein as an output power signal 268 carrying the output voltage 268. The receive resonant tank 250 may include the receive coil 252 coupled with one or more receive resonant capacitors 254. The wireless power transmitter 210 and the wireless power receiver 240 may be incorporated within a wireless power transmitting apparatus 110 (FIG. 1) and a wireless power receiving apparatus 120 (FIG. 1), respectively. The transmit coil 222 and the receive coil 252 (and other components) may be sized according to the particular devices and applications to be associated therewith.

The wireless power transmitter 210 and the wireless power receiver 240 may be generally configured as discussed above with respect to FIG. 1. The configurations of the LC networks within the transmit resonant tank 220 and the receive resonant tank 250 may generally determine the resonant frequencies of the wireless power transmitter 210 and the wireless power receiver 240, respectively. For example, the resonant frequency of the resonant tanks (220, 250) may be based on the inductance of their respective inductive coil (222 and 252) and the capacitance of the capacitors (224 and 254).

During wireless power transmission, the DC input signal 204 may be received by the bridge inverter 206. The bridge inverter 206 may generate an AC current that flows through the transmit resonant tank 220 to generate a time-varying signal for transmitting the wireless power signal 230. Thus, the wireless power signal 230 may be a time-varying signal that is substantially sinusoidal, having a frequency that may be based on the switching frequency of the bridge inverter 206 of the wireless power transmitter 210. In some embodiments, the frequency of the wireless power signal 230 may be set according to a desired frequency, such as a frequency for a particular wireless power standard. The transmit resonant tank 220 may be configured such that the resonant frequency is approximately the frequency of the wireless power signal 230. In some embodiments, it may be desirable for the frequency of the wireless power signal 230 to differ somewhat from the resonant frequency of the transmit resonant tank 220, such as to reduce the peak-to-peak current through the transmit coil 222.

In order to receive the wireless power signal 230, the wireless power receiver 240 may be placed in the coupling region of the wireless power transmitter 210 such that coupling (e.g., inductive, magnetic, or a combination thereof) coupling may be achieved. As a result, the wireless power receiver 240 may receive the wireless power signal 230 and generate an AC power responsive thereto. In order for the power to be used by the load 290, the AC power may be converted to a DC power. The rectifier 260 may generate a rectified voltage ($V_{RECT}$) 262 as well as a rectified current ($I_{RECT}$) flowing through the receive resonant tank 250.

Figure 3:
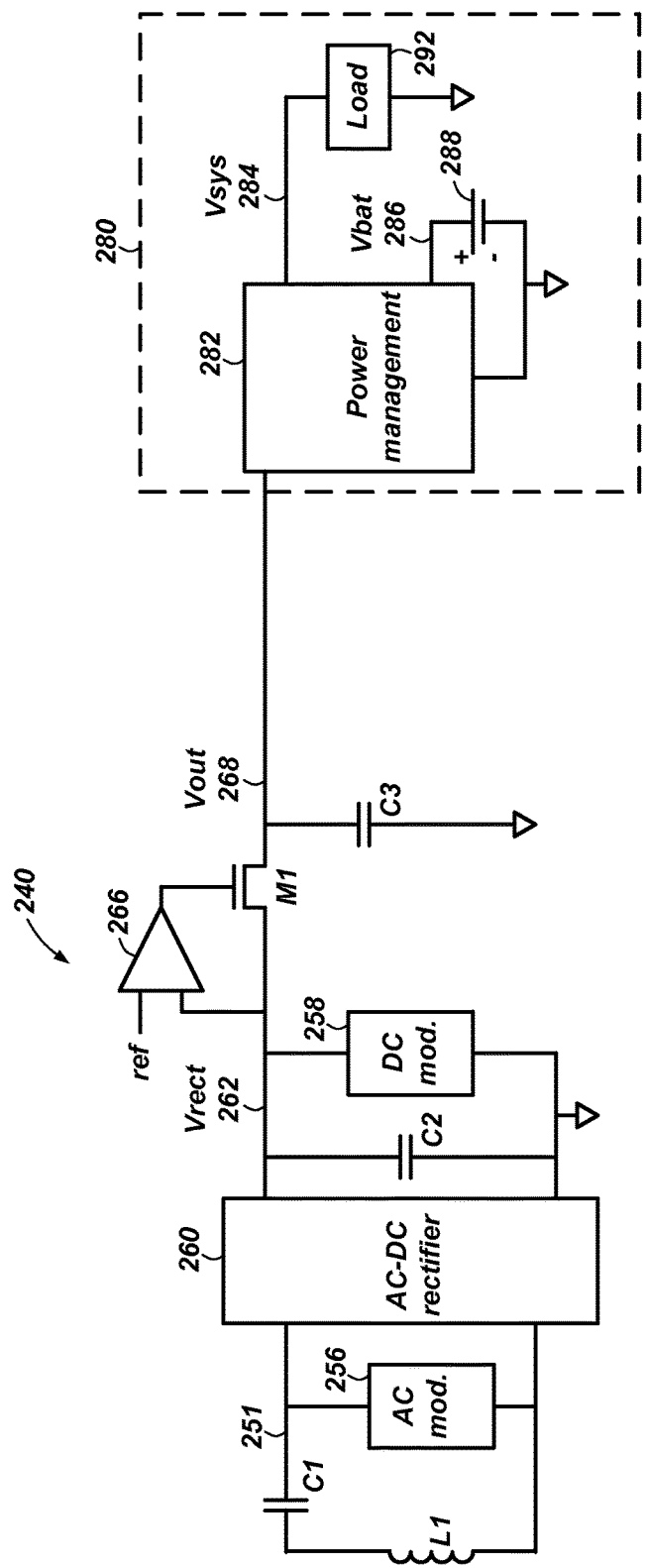
FIG. 3 is a detailed schematic block diagram illustrating a wireless power receiver.

FIG. 3 is a detailed schematic block diagram illustrating a wireless power receiver 240 in more detail. The receive resonant tank 250 is illustrated with inductor L1 as the receive coil 252 (FIG. 2) and capacitor C1 as the one or more receive resonant capacitors 254 to generate an AC power signal 251.

In some embodiments, the rectifier 260 may be configured as a synchronous rectifier. As a result, the rectifier 260 may include one or more switches (e.g., transistors) that are controlled in such a manner to generate DC rectified power (i.e., rectified voltage ($V_{RECT}$) and rectified current ($I_{RECT}$)). The combination of the rectified voltage ($V_{RECT}$) and rectified current ($I_{RECT}$) may also be referred to herein as a DC rectified power signal 262 relative to a rectified ground 264. In some embodiments, the rectifier 260 may include one or more diodes in a bridge configuration configured to generate the DC rectified power signal 262. A filter capacitor C2 may be included to smooth variations in the DC rectified power signal 262.

A power transistor M1 may be included in a pass-transistor configuration to act as a low dropout (LDO) regulator. An output capacitor C3 may be included to provide filtering on the output power signal 268 side of the power transistor M1.

The power transistor M1 may be operated as a fully opened switch allowing the output power signal 268 to follow the DC rectified power signal 262 or as a linear dropout regulator allowing the output power signal 268 to be regulated at a certain voltage level regardless of the voltage level of the DC rectified power signal 262.

In some embodiments an error amplifier 266 may be included to control the gate of the power transistor M1. In such a configuration, the DC rectified power signal 262 may be compared to a reference signal such that the error amplifier 266 maintains a relatively constant current on the output power signal 268.

The output power signal 268 from the power transistor M1 may be used to drive an electronic device 280. The electronic device 280 may include a power management device 282 for controlling and managing power delivery to a battery 288 and system components 292 represented as a load 292 in FIG. 3. The power management device 282 may also control whether power is consumed from the battery 288, the output power signal 268, or a combination thereof.

Referring to FIG. 2 and FIG. 3, in addition to wireless power transfer, the wireless power transmitter 210 and the wireless power receiver 240 may communicate information therebetween. For example, data may be exchanged during initialization of the wireless power transfer, during wireless power transfer, and/or upon conclusion of wireless power transfer. In some embodiments, the wireless power receiver 240 may be configured to communicate data across the receive coil 252 to the wireless power transmitter 210 by varying the impedance of the receive resonant tank 250. This communication process by varying the impedance of the receive resonant tank 250 is often referred to as backscatter modulation.

In some embodiments, an AC modulation circuit 256 may be included, which can be controlled to directly vary the resonance characteristics of the receive resonant tank 250 represented by the inductor L1 and the capacitor C1 in FIG. 3. In some embodiments, a DC modulation circuit 256 may be included, which can be controlled to indirectly vary the resonance characteristics of the receive resonant tank 250 by varying the current through the rectifier 260. Varying the resonance characteristics modifies the impedance that is seen by the wireless power transmitter 210, which can interpret the impedance variations as data.

Unfortunately, there may be load fluctuations on the output power signal 268 due to power demands from a variable load from the electronic device 280 including loads from the battery 288, the system components 292, or a combination thereof. If these load fluctuations occur during a communication period using the backscatter modulation, the load fluctuations can pass through the power transistor M1, affecting the DC rectified power signal 262. Changes in the DC rectified power signal 262 due to the load fluctuations may cause undesired changes to the impedance of the receive resonant tank 250, which may affect the integrity of data communications.

Figure 4:
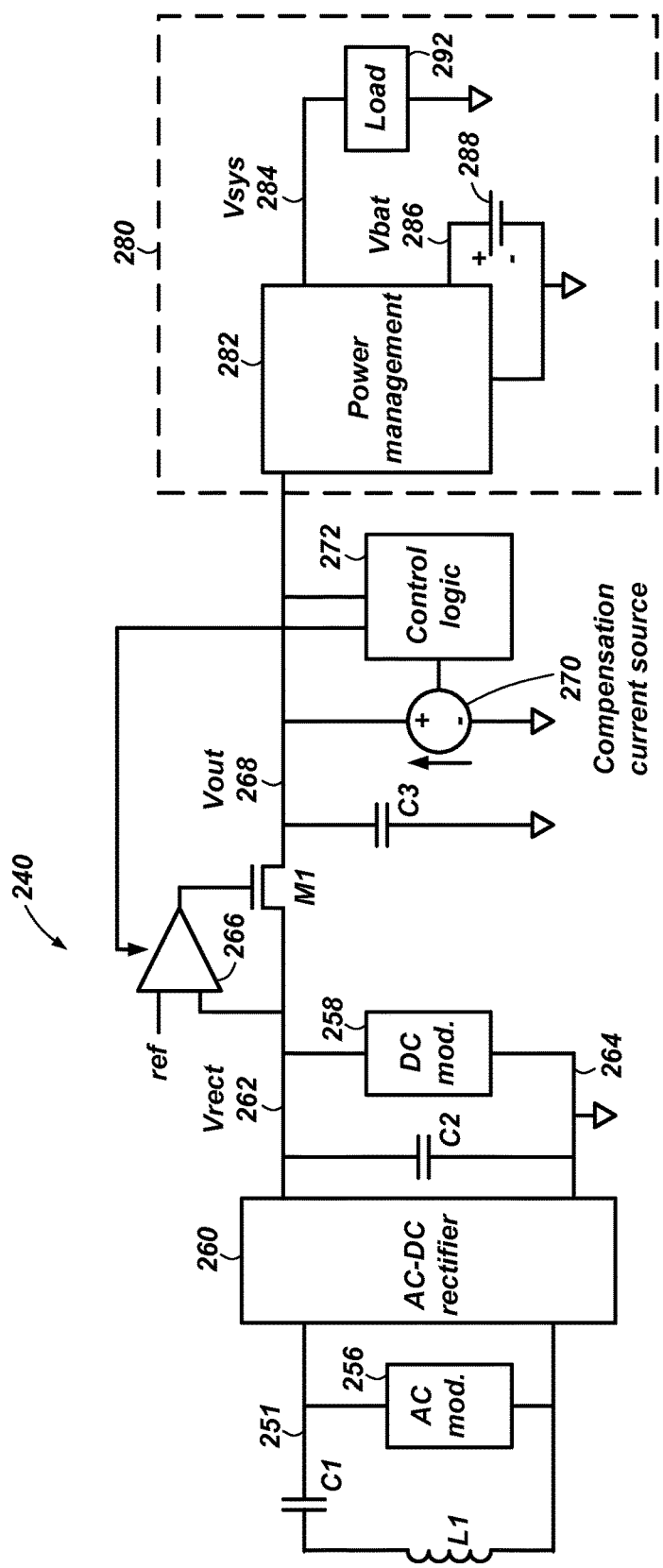
FIG. 4 is a detailed schematic block diagram illustrating a wireless power receiver including a compensation current source.

FIG. 4 is a detailed schematic block diagram illustrating a wireless power receiver 240 including a compensation current source 270 and control logic 272. Except for the compensation current source 270 and the control logic 272, details of the wireless power receiver 240 are the same as those explained above with reference to FIG. 3 and need not be explained again.

The compensation current source 270 may be configured to be enabled during the communication period and configured to supply or consume current from the output power signal 268 to maintain the output power signal 268 at a substantially constant voltage during the communication period. In other words, load fluctuations from the electronic device 280 are substantially absorbed by the compensation current source 270 so they do not pass through the power transistor M1 and affect the backscatter modulation.

The control logic 272 may be configured to control one or more operations of the wireless power receiver 240 including control of the backscatter modulation and control of the compensation current source 270. Thus, the control logic 272 may be configured to enable and disable the compensation current source 270 as well as control the current level through the compensation current source 270. Moreover, the control logic 272 may be configured to control a combination of the error amplifier 266 and the power transistor M1 to operate in a substantially constant current mode during the communication period.

The control logic 272 may be implemented within a processor (e.g., microcontroller) or other circuitry that is configured (e.g., programmed) to perform various operations of embodiments of the present disclosure. The control logic 272 may further include computer-readable media (e.g., memory) storing computing instructions for execution by the processor related to performing processes of the embodiments of the present disclosure. Memory may include volatile and non-volatile memory. In addition, the control logic 272 may further control other functions of the wireless power receive 240, such as controls related to foreign object detection, device operation, etc. The control logic 272 may include different sub-blocks that perform one or more of the above functions separately rather than by employing within a single process, routine, program, etc. In addition, the control logic 272 may each employ different hardware elements for different functions.

In some embodiments, the control logic 272 may be as simple as a feedback amplifier (not shown) with an input coupled to the output power signal 268 and an output configured to control the compensation current source 270. In such embodiments, the feedback amplifier may be compared to a fixed reference at its other input, enabling a predetermined voltage to be set for the output power signal 268 and maintained during load fluctuations. Thus, the feedback amplifier and the compensation current source 270 may be enabled during the communication period to maintain a substantially constant voltage during the communication period regardless of load fluctuations. Of course, the predetermined voltage may be adjusted for different modes of operation by adjusting the reference voltage within the control logic 272 or scaling the output power signal 268 prior to input to the amplifier.

In other embodiments, the control logic 272 may sample a voltage level on the output power signal 268 prior to a communication period. Then, while the communication period is active, the control logic 272 can enable the compensation current source 270 and control the current through the compensation current source 270 to maintain the voltage on the output power signal 268 substantially near the sampled voltage during load fluctuations.

In some embodiments, the power management device 282 may include additional power management features that can be used by the control logic. For example, the control logic 272 may set the output power signal 268 to a level that triggers power management features within the power management device 282. As one example, the power management device 282 may include a constant current mode of operation or a constant voltage mode of operation. Thus, the power management device 282 may include a mode to reduce the charging current when the voltage and/or current at its input drops below a certain threshold.

As another example, the power management device 282 may include a mode such that when the current or voltage on its input reaches a certain level, power for the system components 292 is provided from the battery 288 rather than from the output power signal 268. In such a mode, the compensation current source 270 may be configured to provide the desired current and/or voltage to cause this switch to battery mode, which would reduce or eliminate any load fluctuations at the output power signal 268 due to the system components 292.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power receiver, comprising:
   a receive coil configured to generate an AC power signal responsive to a wireless power signal;
   a rectifier configured to receive the AC power signal and generate a DC rectified power signal;
   a power transistor operably coupled in a pass-transistor configuration and comprising an input node to receive the DC rectified power signal and an output node to provide an output power signal, the power transistor configured to operate in a substantially constant current mode during a communication period employing backscatter modulation on the receive coil;
   a compensation current source coupled to the output node of the power transistor and configured to maintain a substantially constant voltage on the output power signal by adjusting a current through the compensation current source; and
   a control logic coupled to the output node of the power transistor and configured to enable the compensation current source during the communication period.

2. The wireless power receiver of claim 1, further comprising an amplifier operably coupled to the output power signal and configured to adjust the current through the compensation current source responsive to a voltage of the output power signal.

3. The wireless power receiver of claim 1, wherein the control logic is further configured to:
   sample a voltage level of the output power signal prior to the communication period; and control the current through the compensation current source to maintain a voltage of the output power signal substantially near the sampled voltage.

4. The wireless power receiver of claim 1, wherein the control logic is further configured to control the current through the compensation current source to maintain a voltage of the output power signal substantially near a predetermined voltage.

5. The wireless power receiver of claim 4, further comprising:
   a power management device configured to control supply of power for a wireless power enabled apparatus from the output power signal, a battery, or a combination thereof; and
   wherein the control logic is further configured to control the current through the compensation current source to maintain a voltage of the output power signal to a level that triggers the power management device to supply the power for the wireless power enabled apparatus only from the battery.

6. The wireless power receiver of claim 1, further comprising a variable load operably coupled to the output power signal wherein the compensation current source maintains the substantially constant voltage on the output power signal during fluctuations in the variable load occurring during the communication period.

7. A method of operating a receiver side of a wireless power transfer system, the method comprising:
   generating an AC power signal responsive to a wireless power signal exciting a receive coil at a resonant frequency;
   rectifying the AC power signal to generate a DC rectified power signal;
   generating, by a power transistor from the DC rectified power signal, at an output node of the power transistor, an output power signal at a substantially constant current during a communication period employing backscatter modulation on the receive coil; and maintaining a substantially constant voltage on the output power signal by adjusting a current through a compensation current source, coupled to the output node of the power transistor, during the communication period.

8. The method of claim 7, further comprising adjusting the current through the compensation current source responsive to a voltage of the output power signal.

9. The method of claim 7, further comprising:
sampling a voltage level of the output power signal prior to the communication period; and
controlling the current through the compensation current source to maintain a voltage of the output power signal substantially near the sampled voltage.

10. The method of claim 7, further comprising controlling the current through the compensation current source to maintain a voltage of the output power signal substantially near a predetermined voltage.

11. The method of claim 7, further comprising maintaining the substantially constant voltage on the output power signal during fluctuations in a variable load operably coupled to the output power signal, the fluctuations occurring during the communication period.

12. The method of claim 11, wherein the fluctuations in the variable load are due to at least one of a battery of an electronic device and system components of the electronic device.

13. A wireless power enabled apparatus, comprising:
a wireless power receiver, including:
a receive coil configured to generate an AC power signal responsive to a wireless power signal;
a rectifier configured to receive the AC power signal and generate a DC rectified power signal; and
a power transistor operably coupled in a pass-transistor configuration and comprising an input node to receive the DC rectified power signal and an output node to provide an output power signal, the power transistor configured to operate in a substantially constant current mode during a communication period employing backscatter modulation on the receive coil; and
a compensation current source coupled to the output node of the power transistor and configured to maintain a substantially constant voltage on the output power signal by adjusting a current through the compensation current source during the communication period.

14. The wireless power enabled apparatus of claim 13, further comprising an amplifier operably coupled to the output power signal and configured to adjust the current through the compensation current source responsive to a voltage of the output power signal.

15. The wireless power enabled apparatus of claim 13, further comprising control logic configured to enable the compensation current source during the communication period.

16. The wireless power enabled apparatus of claim 15, wherein the control logic is further configured to:
sample a voltage level of the output power signal prior to the communication period; and
control the current through the compensation current source to maintain a voltage of the output power signal substantially near the sampled voltage.

17. The wireless power enabled apparatus of claim 15, wherein the control logic is further configured to control the current through the compensation current source to maintain a voltage of the output power signal substantially near a predetermined voltage.

18. The wireless power enabled apparatus of claim 17, further comprising:
a power management device configured to control supply of power for the wireless power enabled apparatus from the output power signal, a battery, or a combination thereof; and
wherein the control logic is further configured to control the current through the compensation current source to maintain a voltage of the output power signal to a level that triggers the power management device to supply the power for the wireless power enabled apparatus only from the battery.

19. The wireless power enabled apparatus of claim 13, further comprising a variable load operably coupled to the output power signal wherein the compensation current source maintains the substantially constant voltage on the output power signal during fluctuations in the variable load occurring during the communication period.

20. The wireless power enabled apparatus of claim 19, wherein the variable load includes at least one of a battery of the electronic device and system components of the electronic device.

* * * * *